US012769572B2

(12) United States Patent
Corrie

(10) Patent No.: US 12,769,572 B2
(45) **Date of Patent: *Oct. 20, 2026**

(54) MECHANISM FOR MANAGING BARE-METAL CONTAINERIZED APPLICATIONS FROM AN EMBEDDED HYPERVISOR

(71) Applicant: VMware, Inc., Palo Alto, CA (US)

(72) Inventor: Benjamin John Corrie, Tréal (FR)

(73) Assignee: VMware LLC, Palo Alto, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 18/241,160

(22) Filed: Aug. 31, 2023

(65) Prior Publication Data

US 2025/0077252 A1 Mar. 6, 2025

(51) Int. Cl.
*G06F 9/455* (2018.01)

(52) U.S. Cl.
CPC ...... *G06F 9/45558* (2013.01); *G06F 9/45545* (2013.01); *G06F 2009/45591* (2013.01)

(58) Field of Classification Search
CPC ....... G06F 9/45558; G06F 2009/45566; G06F 2009/45587; G06F 2009/4557; G06F 9/45533; G06F 2009/45575
See application file for complete search history.

(56) References Cited

U.S. PATENT DOCUMENTS 9,798,567 B2 * 10/2017 Hu ...................... G06F 9/45558
9,983,891 B1 * 5/2018 Christensen .............. G06F 8/63

(Continued)

FOREIGN PATENT DOCUMENTS

| | | | |
|---|---|---|---|
| EP | 3974994 | A1 | 3/2022 |
| WO | WO-2011-037982 | A1 | 3/2011 |
| WO | WO-2022-037268 | A1 | 2/2022 |

OTHER PUBLICATIONS

Extended European Search Report, European Application No. 24202268.9 dated Feb. 28, 2025, 9 pages.

(Continued)

*Primary Examiner* — Kevin L Young
*Assistant Examiner* — Ivan Alexander Castaneda
(74) *Attorney, Agent, or Firm* — King Intellectual Asset Management

(57) ABSTRACT

An example method of automatically deploying a containerized application on an operating system (OS) of a device is provided. The method generally includes booting the device with the corresponding operating system; powering on a hypervisor as a first user processing running on the OS; powering on a container engine as a second user process running on the OS; booting a virtual machine (VM) running an embedded hypervisor, wherein the VM is running on the hypervisor; and in response to booting the VM: automatically obtaining, by the VM, intended state configuration file(s) defining a control plane configuration for providing services for at least deploying and managing the containerized application and application configuration parameters for the containerized application; deploying a control plane pod configured according to the control plane configuration; deploying container(s) on the OS based on the control plane configuration; and deploying the containerized application on the container(s).

20 Claims, 5 Drawing Sheets

(56) References Cited

U.S. PATENT DOCUMENTS

| | | | | |
|---|---|---|---|---|
| 2017/0093923 | A1 | 3/2017 | Duan | |
| 2017/0214550 | A1 | 7/2017 | Kumar et al. | |
| 2018/0314541 | A1* | 11/2018 | Khan | G06F 9/45558 |
| 2021/0034479 | A1 | 2/2021 | Fukuta et al. | |
| 2021/0311762 | A1* | 10/2021 | Shepherd | G06F 9/45558 |
| 2021/0311765 | A1* | 10/2021 | Subramanian | G06F 9/45558 |
| 2022/0197684 | A1 | 6/2022 | Desai et al. | |
| 2022/0326994 | A1 | 10/2022 | Mueller | |
| 2023/0185580 | A1* | 6/2023 | Cohen | G06F 9/4416 713/2 |

OTHER PUBLICATIONS

U.S. Appl. No. 18/488,313, Non-Final Office Action dated Feb. 4, 2026, 41 pages.
U.S. Appl. No. 18/488,313, Notice of Allowance dated May 29, 2026, 48 pages.

* cited by examiner

MECHANISM FOR MANAGING BARE-METAL CONTAINERIZED APPLICATIONS FROM AN EMBEDDED HYPERVISOR

BACKGROUND

Modern applications are applications designed to take advantage of the benefits of modern computing platforms and infrastructure. For example, modern applications can be deployed in a multi-cloud or hybrid cloud fashion. A multi-cloud application may be deployed across multiple clouds, which may be multiple public clouds provided by different cloud providers or the same cloud provider or a mix of public and private clouds. The term, "private cloud" refers to one or more on-premises data centers that might have pooled resources allocated in a cloud-like manner. Hybrid cloud refers specifically to a combination of public cloud and private clouds. Thus, an application deployed across a hybrid cloud environment consumes both cloud services executing in a public cloud and local services executing in a private data center (e.g., a private cloud). Within the public cloud or private data center, modern applications can be deployed onto one or more virtual machines (VMs), containers, application services, and/or the like.

A container is a package that relies on virtual isolation to deploy and run applications that access a shared operating system (OS) kernel. Containerized applications, also referred to as containerized workloads, can include a collection of one or more related applications packaged into one or more containers. In some orchestration platforms, a set of one or more related containers sharing storage and network resources, referred to as a pod, may be deployed as a unit of computing software. Container orchestration platforms automate the lifecycle of containers, including such operations as provisioning, deployment, monitoring, scaling (up and down), networking, and load balancing.

Kubernetes® (K8S®) software is an example open-source container orchestration platform that automates the operation of such containerized workloads. In particular, Kubernetes may be used to create a cluster of interconnected nodes, including (1) one or more worker nodes that run the containerized workloads (e.g., in a worker plane) and (2) one or more control plane nodes (e.g., in a control plane) having control plane components running thereon that control the cluster. Control plane components make global decisions about the cluster (e.g., scheduling), and can detect and respond to cluster events (e.g., starting up a new pod when a workload deployment's intended replication is unsatisfied) . As used herein, a node may be a physical machine, or a VM configured to run on a physical machine running a hypervisor. Kubernetes software allows for distributed computing by running the pods of containerized workloads on a cluster of interconnected worker nodes (e.g., VMs or physical machines) that may scale vertically and/or horizontally over hybrid cloud topology.

While containers are the building-blocks that enable a scalable environment, containers are not the only part of the software stack that needs to scale. In particular, tools used to instantiate, manage, monitor, and/or secure containers may also need to be able to scale as seamlessly as the containers. In other words, scalability of virtualization software and architecture for deploying and managing containerized workloads may also affect an ability of the environment to handle an increased or expanding workload.

For example, a software-defined data center (SDDC) includes clusters of physical servers (e.g., hosts) that are virtualized and managed by virtualization management servers. A host can include a virtualization layer (e.g., a hypervisor) that provides a software abstraction of the hardware platform of the physical server (e.g., central processing unit (CPU), random access memory (RAM), storage, network interface card (NIC), etc.) to allow multiple virtual computing instances (e.g., such as VMs) to run thereon. A control plane for each cluster of hosts may support the deployment and management of applications (or services) on the cluster using containers. In some cases, the control plane deploys applications as pods of containers running on one or more worker nodes. Accordingly, scalability of the environment may also depend on the operational effort required to initialize the control plane and/or worker nodes for container deployment, as well as an ability of the control plane to determine a context defined in a manifest for instantiation of workloads in these containers.

It should be noted that the information included in the Background section herein is simply meant to provide a reference for the discussion of certain embodiments in the Detailed Description. None of the information included in this Background should be considered as an admission of prior art.

SUMMARY

One or more embodiments provide a method of automatically deploying a containerized application on an operating system of a device. The method generally includes booting the device with the corresponding operating system. The method generally includes powering on a hypervisor as a first user processing running on the operating system. The method generally includes powering on a container engine as a second user process running on the operating system. The method generally includes booting a virtual machine (VM) running an embedded hypervisor, wherein the VM is running on the hypervisor. Further the method generally includes, in response to booting the VM: automatically obtaining, by the VM, one or more intended state configuration files defining a control plane configuration for providing services for at least deploying and managing the containerized application and application configuration parameters for the containerized application. The method generally includes deploying a control plane pod configured according to the control plane configuration. The method generally includes deploying one or more containers based on the control plane configuration, wherein the one or more containers are deployed on the operating system via the container engine. Further, the method generally includes deploying the containerized application identified by the application configuration parameters on the one or more containers.

Further embodiments include a non-transitory computer-readable storage medium comprising instructions that cause a computer system to carry out the above methods, as well as a computer system configured to carry out the above methods.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
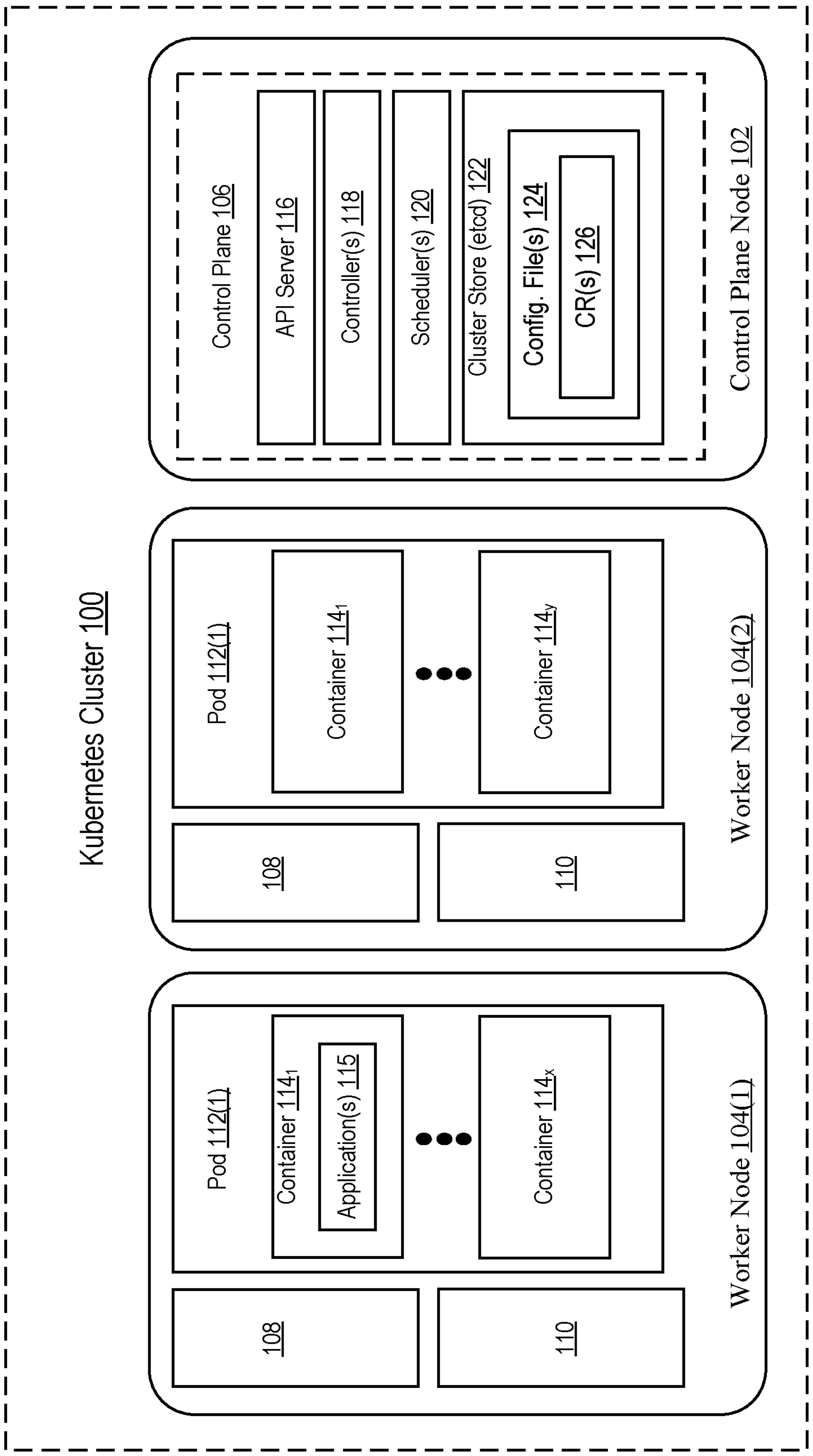
FIG. 1 is a block diagram of an exemplary cluster for running containerized workloads, according to embodiments of the present disclosure.

An auto-deployment system for automatically deploying and/or managing containerized applications on bare-metal, at scale is provided herein. As used herein, containerized applications deployed on bare-metal are containers, having one or more applications, that are running directly on an operating system (OS) of a physical machine (e.g., a bare-metal server), via a container engine that allows for multiple, isolated containers to be run on the same OS kernel.

Automated deployment refers to the automation of steps, processes, and/or activities that are necessary to make a system and/or update available to its intended users. As described in more detail below, automation of much of the operational effort required to set up and/or manage a system capable of supporting bare-metal, containerized applications is based on an ability of the system to access one or more intended state configuration files made up of one or more manifests that declare intended system infrastructure and applications to be deployed in the system.

For example, deployment of the system to a device may be triggered by a user booting a device (e.g., a bare-metal server), with an operating system (OS) installed on the device. The OS may be a standard, commodity operating system such as Microsoft Windows, Linux, and/or the like, configured to carry out various processes (e.g., executing programs), such as user processes, daemon processes, and/or kernel processes. A user process runs in a user space and may have reduced access privileges to certain resources, such as compared to kernel processes. For the system described herein, the OS allows a hypervisor to be run as a user process on top of the OS. The hypervisor is a type of virtualization software that supports the creation and management of virtual endpoints, such as virtual machine (VMs). Further, the OS enables a container engine to be deployed thereon for running multiple, isolated instances on the OS kernel (e.g., bare-metal containers).

At least one of the VMs, running on the hypervisor, implements a virtual hardware platform that supports the installation of an embedded hypervisor in the VM. As used herein, an "embedded hypervisor" is a hypervisor instantiated and existing within a VM or another type of virtual computing instances (VCI). The embedded hypervisor may be installed in the VM based on running an initialization script. The embedded hypervisor may include an infrastructure supervisor (infravisor) layer that provides a runtime for services for a cluster of nodes. A control plane and one or more infravisor pods may be instantiated on the infravisor layer to provide a service for deploying and/or managing bare-metal, containerized applications.

The control plane may be created to deploy and automatically manage clusters of containerized applications, on bare-metal, such that they align with their intended states as defined in one or more intended state configuration files. Accordingly, when deployed, the control plane may be configured to (1) determine one or more intended infrastructure configuration parameters by obtaining one or more of the intended state configuration files and (2) build the infrastructure based on these determined parameters. The one or more intended state configuration files may be obtained by the control plane from an accessible external datastore (e.g., at an external server) or a universal serial bus (USB) thumb drive. The intended infrastructure configuration parameters may declare infrastructure necessary for the deployment of one or more applications, for example, at least a number of containers necessary for deployment on the OS kernel of the device (e.g., the bare-metal host). The infravisor pods, instantiated in the infravisor layer, may be used to (1) determine one or more applications to be instantiated on the created infrastructure, by obtaining one or more of the intended state configuration files and (2) instantiate these applications. The one or more intended state configuration files may be obtained by the control plane at an accessible external datastore (e.g., at an external server) or a USB thumb drive. In some cases, these applications are instantiated in one or more containers (e.g., bare-metal containers) running on the OS kernel.

As such, when booted, the system described herein is designed to automatically pull intended configuration parameters (e.g., from an external datastore) and apply these parameters to automatically configure an underlying infrastructure (e.g., both virtualization infrastructure and bare-metal infrastructure) of the system and execute containerized applications on the bare-metal infrastructure. Accordingly, human interaction and/or intervention with the system may not be necessary, thereby resulting in a more streamlined deployment of containerized applications which may help to decrease errors, increase speed of delivery, boost quality, minimize costs, and overall, simplify the deployment process. Further, the auto-deployed system described herein may be able to scale. For example, introducing automation into deployment of the containerized applications and underlying infrastructures allows for a same system to be instantiated multiple times, and/or a much larger system (including multiple clusters, containers, applications, etc.) to be instantiated in the same way (e.g., without human intervention).

Additionally, deploying containerized applications on bare-metal, as opposed to on virtualization software, provides advantages from a performance and resource utilization perspective. In particular, hardware resources generally needed to run the virtualization software and/or guest OSs when containerized applications are deployed on VMs are saved by instead deploying the containerized applications directly on the OS. As such, almost all, if not all, of the computation, storage, and memory resources may be allocated to the containerized applications, thereby improving overall application performance. Further, some users may prefer that their applications be deployed on bare-metal for one or more reasons (e.g., a preference of the user, an opposition to using virtualization for running containerized applications due to a high sensitivity of the containerized applications, etc.). Thus, the system described herein enables a single piece of hardware to run a control plane on virtualized infrastructure and enable such users to deploy their containerized applications on bare-metal.

Further, the system described herein offers logical separation of a state of the control plane from a state of the containerized applications deployed on bare-metal, as well as separate management of each of the states. For example, the state of the control plane is managed by a control plane pod within the control plane. The state of the containerized applications is managed by a worker pod in an extension plane, which is separated from the control plane (e.g., both running on the embedded hypervisor). Isolation of the control plane from the containerized applications may result in improved redundancy, security, and/or scalability.

Though embodiments herein describe control plane components instantiated via an embedded hypervisor of a VM and used to deploy and automatically manage clusters of containerized applications, on bare-metal, in certain other embodiments, the control plane components may simply be running in a control plane node (e.g., a VM) without an embedded hypervisor. In both implementations, virtualization is used to isolate the control plane from bare-metal processes.

Figure 2:
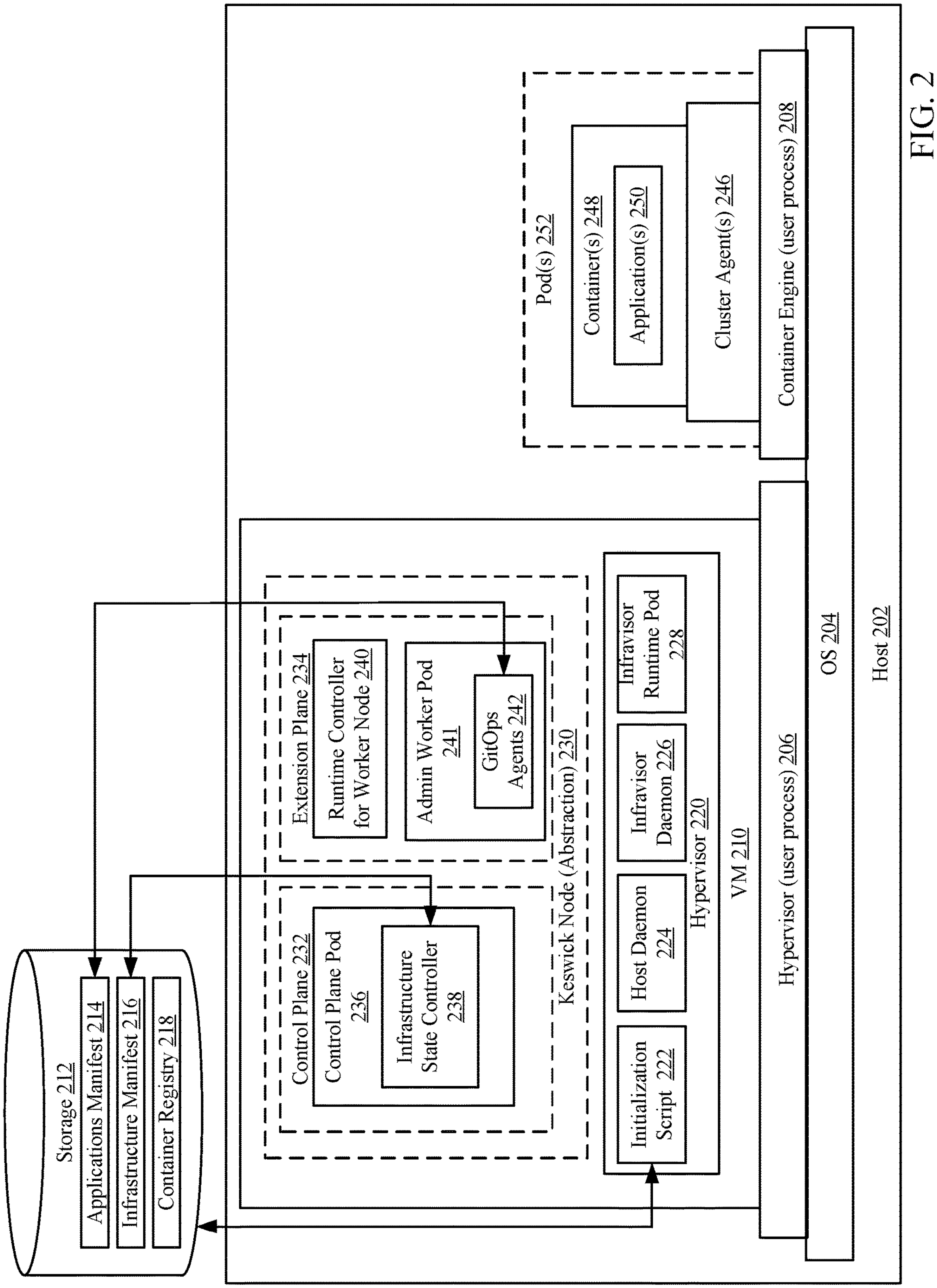
FIG. 2 is a block diagram of an example system for deploying and managing distributed containerized applications at scale and on bare-metal, according to aspects of the present disclosure.

Turning now to FIG. 1, a block diagram of an exemplary cluster for running containerized applications is illustrated. It should be noted that the block diagram of FIG. 1 is a logical representation of an exemplary container-based cluster, and does not show where the various components are implemented and run on physical systems. FIG. 2 provides an example system for implementing and running the exemplary container-based cluster of FIG. 1. While the example container-based cluster shown in FIG. 1 is a Kubernetes cluster 100, in other examples, the container-based cluster may be another type of container-based cluster based on container technology, such as Docker® clusters.

As illustrated in FIG. 1, Kubernetes cluster 100 is formed from a cluster of interconnected nodes, including (1) one or more worker nodes 104 that run one or more pods 112 having containers 114 (e.g., running application(s) 115, such as any software program, for example, a word processing program) and (2) one or more control plane nodes 102 having control plane components running thereon that control the cluster (e.g., where a node is a physical machine, such as a host 202 illustrated in FIG. 2, or a VM 210 configured to run on a host 202 illustrated in FIG. 2). Worker nodes 104 are managed by control plane nodes 102, which manages the computation, storage, and memory resources to run all worker nodes 104.

Each worker node 104, includes a kubelet 108. Kubelet 108 is an agent that helps to ensure that one or more pods 112 run on each worker node 104 according to a defined state for the pods 112, such as defined in a configuration file. Each pod 112 may include one or more containers 114. The worker nodes 104 can be used to execute various applications and software processes using container 114. Further each worker node 104 may include a kube proxy 110. Kube proxy 110 is a network proxy used to maintain network rules. These network rules allow for network communication with pods 112 from network sessions inside and/or outside of Kubernetes cluster 100.

Control plane 106 (e.g., running on one or more control plane nodes 102) includes components such as an application programming interface (API) server 116, controller(s) 118, scheduler(s) 120, and a cluster store (etcd) 122. Control plane 102's components make global decisions about Kubernetes cluster 100 (e.g., scheduling), as well as detect and respond to cluster events (e.g., starting up a new pod 112 when a workload deployment's replicas field is unsatisfied).

API server 116 operates as a gateway to Kubernetes cluster 100. As such, a command line interface, web user interface, users, and/or services communicate with Kubernetes cluster 100 through API server 116. One example of a Kubernetes API server 116 is kube-apiserver. The kube-apiserver is designed to scale horizontally—that is, this component scales by deploying more instances. Several instances of kube-apiserver may be run, and traffic may be balanced between those instances.

Controller(s) 118 is responsible for running and managing controller processes in Kubernetes cluster 100. As described above, controller(s) 118 may have (e.g., four) control loops called controller processes, which watch the state of Kubernetes cluster 100 and try to modify the current state of Kubernetes cluster 100 to match an intended state of Kubernetes cluster 100. In certain embodiments, controller processes of controller(s) 118 are configured to monitor external storage for changes to the state of Kubernetes cluster 100.

Scheduler(s) 120 is configured to allocate new pods 112 to worker nodes 104. Additionally, scheduler(s) 120 may be configured to distribute resources and/or workloads across worker nodes 104. Resources may refer to processor resources, memory resources, networking resources, and/or the like. Scheduler(s) 120 may watch worker nodes 104 for how well each worker node 104 is handling their workload, and match available resources to the worker nodes 104. Scheduler(s) 120 may then schedule newly created containers 114 to one or more of the worker nodes 104.

Cluster store (etcd) 122 is a data store, such as a consistent and highly-available key value store, used as a backing store for Kubernetes cluster 100 data. In certain embodiments, cluster store (etcd) 122 stores configuration file(s) 124, such as JavaScript Object Notation (JSON) or YAML files, made up of one or more manifests that declare intended system infrastructure and workloads to be deployed in Kubernetes cluster 100. Kubernetes objects, or persistent entities, can be created, updated and deleted based on configuration file(s) 124 to represent the state of Kubernetes cluster 100.

A Kubernetes object is a "record of intent"—once an object is created, Kubernetes cluster 100 will constantly work to ensure that object is realized in the deployment. One type of Kubernetes object is a custom resource definition (CRD) object (also referred to herein as a "custom resource (CR) 126") that extends API server 116 or allows a user to introduce their own API into Kubernetes cluster 100. In particular, Kubernetes provides a standard extension mechanism, referred to as custom resource definitions, that enables extension of the set of resources and objects that can be managed in a Kubernetes cluster.

As such, control plane 102 manages and controls every component of Kubernetes cluster 100. Control plane 102 handles most, if not all, operations within Kubernetes cluster 100, and its components define and control cluster 100's configuration and state data. Control plane 102 configures and runs the deployment, management, and maintenance of the containerized applications 115. Accordingly, ensuring high availability of the control plane may be critical to container deployment and management. High availability is a characteristic of a component or system that is capable of operating continuously without failing.

Accordingly, in certain aspects, control plane 102 may operate as a high availability (HA) control plane. Additional details of HA control planes are disclosed in U.S. Application Ser. No. 63/347,815, filed on Jun. 1, 2022, and titled "AUTONOMOUS CLUSTERS IN A VIRTUALIZATION COMPUTING ENVIRONMENT," which is hereby incorporated by reference herein in its entirety.

As mentioned, while container orchestration platforms, such as Kubernetes, provide automation to deploy and run clusters of containerized applications (e.g., such as Kubernetes cluster 100 illustrated in FIG. 1), thereby allowing for easy scalability of containers based on application requirements, containers are not the only part of the software stack that needs to be automated for scaling. For example, deployment of a control plane (e.g., such as control plane 102 illustrated in FIG. 1) may be necessary for the deployment and management of such containerized workloads.

Accordingly, as discussed, embodiments of the present disclosure provide a system for fully automatically deploying and/or managing distributed containerized applications at scale. Architecture of the auto-deployed system described herein includes an improved system designed for deploying and managing distributed, containerized applications at scale, where the containerized applications are deployed on bare-metal while the control plane used to deploy and manage these containerized application is running on virtualization software. In particular, the system described herein includes one or more components configured to automatically configure and deploy a control plane for managing containerized applications. The control plane may be configured and deployed on an embedded hypervisor of a VM. The system further includes one or more components to determine a number of containers needed for deployment of intended applications (e.g., workloads), deploy the determined number of containers on bare-metal (e.g., on an OS via container engine), and instantiate the intended applications on the deployed containers. Further, the system design described herein offers physical separation of a state of the control plane used to manage the deployed applications from a state of the containers where the applications are deployed.

FIG. 2 is a block diagram of an auto-deployed system 200 for deploying and managing distributed containerized applications at scale and on bare-metal, according to aspects of the present disclosure. The architecture of system 200 described in FIG. 2 may allow for implementation of a container-based cluster. For example, a logical construct of Kubernetes cluster 100 illustrated in FIG. 1 may be implemented by the architecture described below with reference to FIG. 2. Further, such architecture may bring along with it a new management model, as described in more detail below.

The architecture of system 200 includes a host 202 constructed on a server grade hardware platform (not illustrated), such as an x86 architecture platform. The hardware platform of host 202 includes components of a computing device such as one or more processors (central processing units (CPUs)), memory (random access memory (RAM)), one or more network interfaces (e.g., physical network interfaces (PNICs)), local storage, and other components for running components described herein.

Host 202 includes an OS 204 (e.g., software installed on host 202) that interacts with the underlying hardware of host 202. In other words, OS 204 manages the resources of host 202. Examples of OS 204 may include Microsoft Windows, Linux, and/or the like, configured to carry out various processes (e.g., executing programs), such as user processes, daemon processes, and/or kernel processes.

In particular, OS 204 is a multi-layer entity, where each layer is provided a different level of privilege. OS 204 architecture may include underlying OS features, referred to as a kernel, and processes that run on top of the kernel. The kernel may be a microkernel that provides functions such as process creation, process control, process threads, signals, file system, etc. A process running on or above the kernel may be referred to as a "user process." A user process may run in a limited environment. A privilege level of the kernel may be greater than a privilege level of a user process.

In certain embodiments, OS 204 allows a hypervisor 206 to run as a user process on top of OS 204. Further, in certain embodiments, OS 204 allows for a container engine 208 to be deployed on OS 204, also as a user process, to provide the low-level functionality needed for managing containers 248 and the underlying resources of host 202, such as CPU, memory, and storage.

As mentioned, a hypervisor, such as hypervisor 206, is a type of virtualization software that supports the creation and management of virtual endpoints by separating a physical machine's software from its hardware. In other words, hypervisors translate requests between physical and virtual resources, thereby making virtualization possible. In certain embodiments, hypervisor 206 is configured to abstract processor, memory, storage, and networking resources of the hardware platform of host 202 into one or more virtual machines (VMs) that run concurrently on host 202, such as VM 210 in FIG. 2. One example of hypervisor 206 that may be configured and used in embodiments described herein is a VMware ESXi™ hypervisor provided as part of the VMware vSphere® solution made commercially available by VMware, Inc. of Palo Alto, CA.

VM 210 implements a virtual hardware platform (not shown) that supports the installation of an embedded hypervisor, such as hypervisor 220, in VM 210. Similar to hypervisor 206, hypervisor 220 is capable abstracting processor, memory, storage, and networking resources allocated to VM 210 for executing one or more components illustrated in FIG. 2. However, hypervisor 220 runs in conjunction with a guest OS (not shown) executing in VM 210 (e.g., capable of executing one or more applications and/or processes), while hypervisor 206 runs in conjunction with OS 204 of host 202.

In certain embodiments, a user interface (not shown) may be provided to enable users to interact with hypervisor 220, such as to check on system status, update configuration, etc. The user interface may be accessible by directly accessing host 202, or by accessing host 202 over a network, such as via machine web browser or application programming interface (API) client. For example, hypervisor 220 may include a host daemon 224 running as a background process, which in part allows connection to hypervisor 220 for monitoring hypervisor 220.

Hypervisor 220, as part of an infravisor layer, may include an infravisor daemon 226 running as a background process. In certain embodiments, infravisor daemon 226 is an infravisor watchdog running on hypervisor 220. The infravisor daemon 226 is configured to monitor individual infravisor services (e.g., including an infravisor runtime pod 228, described in detail below) running in a cluster of hosts to help guarantee that a minimum number of individual services are continuously running in the cluster. In certain embodiments, infravisor daemon 226 monitors an API server (e.g., such as API server 116 illustrated in FIG. 1) to determine whether a minimum number of individual services are running.

Hypervisor 220, as part of the infravisor layer, may further include an infravisor runtime pod 228, which may be a pod of containers running on the hypervisor 220 that executes control plane entities, such as API server 116, cluster store (etcd) 122, controller(s) 118, and scheduler(s) 120 illustrated in FIG. 1, for a cluster of hosts. These components may run as separate or consolidated pods for isolation or footprint reduction, respectively. The infravisor runtime pod 228 may access the cluster store (etcd) 122 to store a cluster's runtime state. In certain aspects, the infravisor runtime pod 228 is bootstrapped on a host in a cluster when the infravisor daemon 226 detects the absence of a functional infravisor runtime pod. It should be noted that such control plane functionality provided by infravisor runtime pod 228 may be separate from the control plane 232 described herein for worker nodes. In particular, while infravisor runtime pod 228 and a control plane pod 236 of control plane 232 may execute similar control plane/runtime entities, in certain embodiments, the infravisor runtime pod 228 runs in a higher privilege level than control plane pod 236 of control plane 232. Further, while infravisor runtime pod 228 may manage at least part of the lifecycle of pods or services for running containerized applications, control plane pod 236 of control plane 232 manages the runtime state of such containerized applications, and the infrastructure necessary for implementation.

Hypervisor 220 provides resources of host 202 to run one or more pods or services, collectively referred to as a Keswick node 230, which is a logical abstraction of the one or more pods or services. (The term, "Keswick" is an arbitrary name given to the abstraction for purpose of easy reference.) The pods and services of the Keswick node 230 are logically separated by function into a control plane 232 and an extension plane 234, which are used to provide services for deploying and/or managing containerized workloads.

Control plane 232 includes a control plane pod 236, which may be a pod of containers running on the hypervisor 220 that execute control plane entities, such as API server 116, cluster store (etcd) 122, controller(s) 118, and scheduler(s) 120 illustrated in FIG. 1, for containerized applications. The control plane pod 236 runs an infrastructure state controller 238 configured to manage the state of control plane 232. In certain embodiments, control plane 232 is configured based on infrastructure manifest 216 stored in storage 212.

Infrastructure manifest 216 provides information about intended system infrastructure to be deployed on host 202. For example, infrastructure manifest 216 may define the infrastructure on which containerized applications 250 are expected to run. This may include information about a number of pods 252, container(s) 248 to instantiate on host 202 (e.g., bare-metal containers), the assignment of hardware resources to pods 252 and/or containers 248, software configuration (e.g., a version of Kubernetes and application uses), and/or network infrastructure (e.g., a software defined network). Host 202 running one or more containers 248, deployed as pods 252, constitutes an example worker node in the container-based cluster.

As an illustrative example, the infrastructure manifest 216 may indicate a number of containers 248 to deploy, as a pod 252, on OS 204 (e.g., via container engine 208) and, in some cases, images to use for instantiating each of these containers 248. The number of containers 248 indicated in infrastructure manifest 216 may be a number of containers needed to run particular applications defined in an applications manifest 214.

In certain aspects, infrastructure manifest 216 is included in an intended state configuration file. In certain aspects, the intended state configuration file may include one or more other manifests (e.g., such as applications manifest 214). In some cases, the intended state configuration file is stored in storage 212, which may be an external storage that is accessible by hypervisor 220. Storage 212 may further be accessible by infrastructure state controller 238 of control plane 232 after the control plane 232 is instantiated, such as to monitor for updates to the infrastructure manifest 216 and automatically update the configuration of control plane 232, accordingly. In certain embodiments, storage 212 is a repository on a version control system. One example version control system that may be configured and used in embodiments described herein is GitHub made commercially available by GitHub, Inc.

In certain embodiments, by keeping the infrastructure manifest 216 separate from the applications manifest 214, patching (e.g., identifying, acquiring, testing and installing patches, or code changes, that are intended to resolve functionality issues, improve security, and/or add features) of these manifests may be less complex and easier to manage, as changes to infrastructure configuration parameters are independent of changes to intended workload definitions due to the file separation. It should be noted that any number of intended state configuration files may be used, such as a single file including both intended infrastructure configuration parameters and intended application definitions.

As such, hypervisor 220 may be configured to pull information from infrastructure manifest 216 and use this information to instantiate and configure control plane 232, such as by instantiating and configuring control plane pod 236. In certain embodiments, this involves instantiating a worker plane by deploying one or more containers 248, in pod(s) 252 on OS 204, for running applications 250. A number of containers 248 deployed on top of OS 204 may be based, at least in part, on a number of containers indicated for deployment in infrastructure manifest 216.

Infrastructure state controller 238 on control plane 232 is configured to manage a state of the infrastructure. In other words, infrastructure state controller 238 accepts an "intended state" (also referred to as "desired state" or "declared state") from a human operator (e.g., via infrastructure manifest 216), observes the state of the infrastructure, and dynamically configures the infrastructure such that the infrastructure matches the "intended state." Accordingly, infrastructure state controller 238 may also be configured to interact with infrastructure manifest 216 stored in storage 212.

Further, in certain embodiments, infrastructure state controller 238 monitors storage 212 for changes/updates to infrastructure manifest 216. Infrastructure state controller 238 may be configured to dynamically update the infrastructure such that the infrastructure matches a new "intended state" defined by infrastructure manifest 216, for example, when infrastructure state controller 238 determines infrastructure manifest 216 has been updated.

Each container 248 deployed on OS 204 (e.g., on bare-metal) is allocated compute resources of host 202 that use software to run programs and deploy applications 250. One or more cluster agents 246 may additionally be deployed on OS 204 to each monitor the health of one or more containers 248 and one or more pods 252. For example, each cluster agent 246 may be configured to collect metrics and metadata for container(s) 248 and/or pod(s) 252. A cluster agent 246, itself, may be a container or pod deployed on OS 204.

As shown in FIG. 2, containerized applications 250 and cluster agents 246 are isolated from control plane 232; thus, containerized applications 250 and their corresponding cluster agents 246 are similarly isolated from control plane 232. Resources of host 202 managed by container engine 208 and dedicated for running the containerized applications 250 and cluster agents 246 may be distinct from resources, managed by hypervisor 206, used to run VM 210, hypervisor 220, control plane 232, and extension plane 234.

Extension plane 234 includes a runtime controller for the worker nodes and an admin worker pod 241 which includes GitOps agents 242. In certain embodiments, GitOps agents 242 are configured to interact with applications manifest 214 (also referred to as "workloads manifest") stored in storage 212.

Applications manifest 214 provides information about intended applications 250 to be deployed in pods 252 on OS 204. For example, applications manifest 214 may outline details of one or more applications 250 to be deployed in pods 252 having one or more containers 248 running on bare-metal. In particular, in certain embodiments, applications manifest 214 includes an identifier of a binary to be loaded. In certain embodiments, applications manifest 214 includes information about resources to be deployed, application parameters associated with these resources, and/or protected resources for one or more applications. The application parameters may include an application name, an application ID, a service name, an associated organization ID, and/or the like.

In certain embodiments, applications manifest 214 is included in an intended state configuration file. In some cases, the intended state configuration file may include one or more other manifests (e.g., such as infrastructure manifest 216). The intended state configuration file may be stored in storage 212 which is external storage that is accessible by GitOps agents 242.

As such, GitOps agents 242 may be configured to pull information from applications manifest 214 and use this information to instantiate applications 250 on containers 248 running on OS 204 (e.g., previously deployed by control plane 232).

Runtime controller for worker node 240 is configured to manage a state of the worker node (e.g., a state of the containers 248, applications 250 on host 202). In other words, runtime controller for worker node 240 accepts an "intended state" (also referred to as "intended stated" or "declared state") from a human operator (e.g., via applications manifest 214), observes the state of the worker node, and dynamically configures the worker node such that its behavior matches the "intended state."

Further, in certain embodiments, runtime controller for worker node 240 monitors storage 212 for changes/updates to applications manifest 214. Runtime controller for worker node 240 may be configured to dynamically update the state of the worker node to match a new "intended state" defined by applications manifest 214, for example, when runtime controller for worker node 240 determines applications manifest 214 has been updated.

In certain embodiments, privilege becomes diluted when moving from bottom to top layers of hypervisor 220. As such, in certain embodiments, the infravisor layer of hypervisor 220 is at a lower, more privileged level of hypervisor 220, while control plane 232 and extension plane 234 are at a lesser-privileged level in hypervisor 220.

Further, in addition or alternative to different privilege levels, defined management levels may be assigned to different entities. For example, in certain embodiments, the worker node is managed by control plane pod 236 of control plane 232, and the control plane pod 236 is managed by the infravisor layer of hypervisor 2201.

It should be noted that Keswick Node 230 is a logical abstraction that represents control plane 232 and extension plane 234. Though certain example implementations are described herein of how each of the control plane 232, extension plane 234, and the worker node are implemented (e.g., as pods, VMs, etc.) and where they run (e.g., in hypervisor 220, on top of hypervisor 220, on top of OS 204, etc.), it should be noted that other implementations may be possible, such as having certain components run in different privilege levels, layers, within hypervisor 220, outside hypervisor 220, etc.

Further, as shown in FIG. 2, hypervisor 220 includes an initialization script 222. Initialization script 222 is a sequence of instructions that are interpreted or carried out during startup of hypervisor 220. Initialization script 222 helps to automate the deployment of hypervisor 220 and Keswick node 230. In other words, initialization script 222 helps to automate and streamline the deployment of bare-metal, containerized applications 250.

In certain embodiments, initialization script 222 interacts with container registry 218 available in storage 212. Container registry 218 may be a repository, or a collection of repositories, used to store and access container images. Although container registry 218 is illustrated as being stored in storage 212 with applications manifest 214 and infrastructure manifest 216, in certain other embodiments, container registry 218 may be stored separately from one or both of these manifests.

Figure 3A:
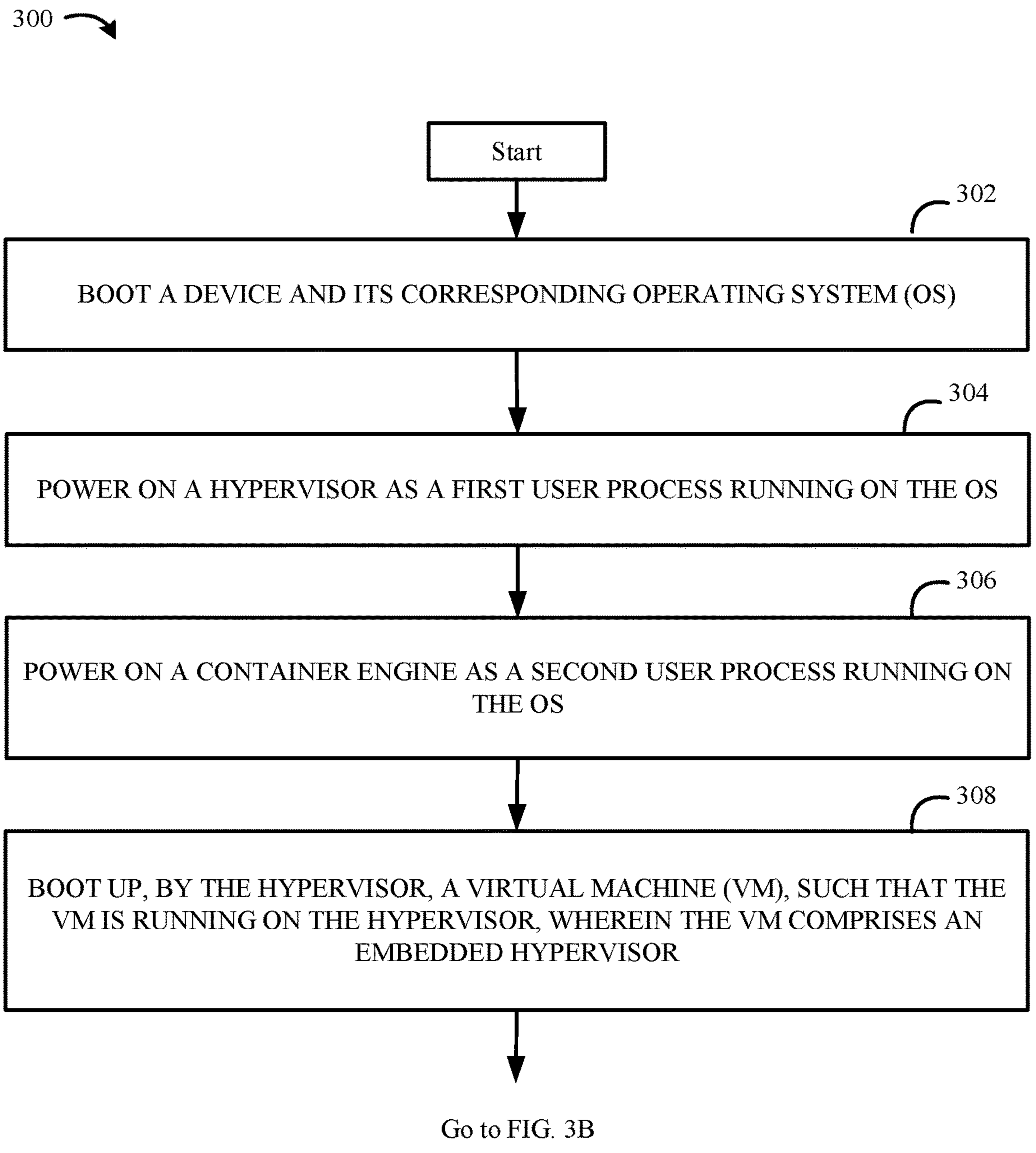
FIGS. 3A and 3B provide a flow diagram illustrating example operations for automatically deploying containerized applications on bare-metal, according to embodiments of the present disclosure.
Figure 3B:
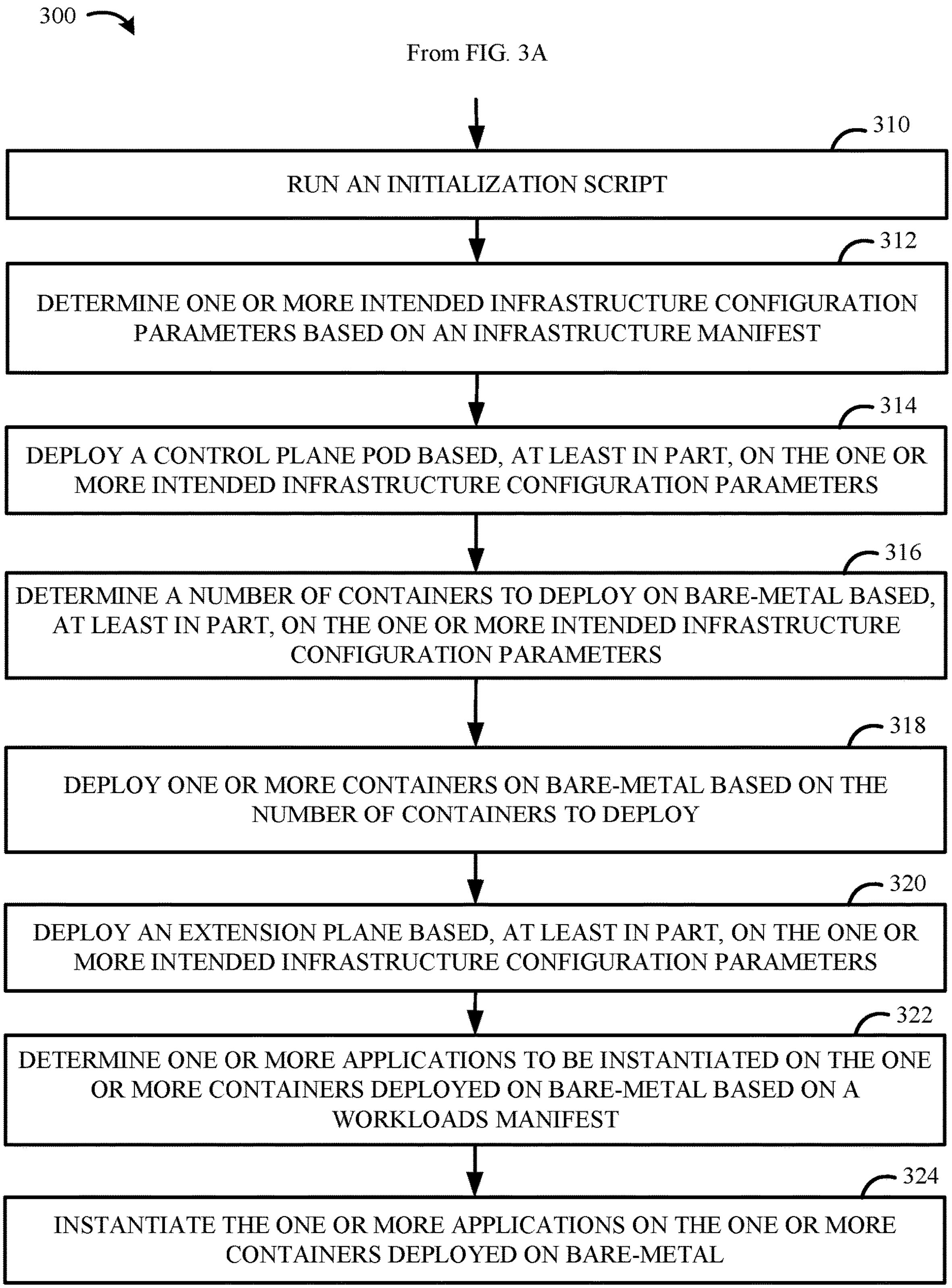

FIGS. 3A and 3B provide a flow diagram illustrating example operations 300 for automatically deploying containerized applications on bare-metal, according to embodiments of the present disclosure. In particular, operations 300 provide a method which eliminates the need for human intervention when deploying containerized applications, for example, on an OS of a host, via a container engine. Operations 300 may be performed by components illustrated in FIG. 2.

Operations 300 begin, at block 302, by booting a device and its corresponding OS, such as host 202 and its corresponding OS 204 illustrated in FIG. 2.

Operations 300 proceed, at blocks 304 and 306, respectively, with powering on a hypervisor (e.g., hypervisor 206 in FIG. 2) as a first user process running on the OS and powering on a container engine (e.g., container engine 208 in FIG. 2) as a second user process running on the OS.

Operations 300 proceed, at block 308, with the hypervisor booting up a VM (e.g., VM 210 in FIG. 2) such that the VM is running on the hypervisor. The VM, when booted, includes an embedded hypervisor (e.g., hypervisor 220 in FIG. 2) running in the VM. The VM may be booted from a universal serial bus (USB) thumb drive, a synchronous dynamic random access memory (SD-RAM) card, a preboot execution environment (PXE), or the like to load the embedded hypervisor.

Operations 300 proceed, at block 310 (illustrated in FIG. 3B), with running an initialization script (e.g., initialization script 222 in FIG. 2). For example, instructions included in the initialization script are executed to initiate automatic deployment of containerized applications and their necessary infrastructure on the device (e.g., host 202).

Operations 300 proceed, at block 312, with determining one or more intended infrastructure configuration parameters based on an infrastructure manifest (e.g., infrastructure manifest 216 in FIG. 2). For example, embedded hypervisor 220, based on instructions in initialization script 222, pulls information from infrastructure manifest 216 stored on storage 212 to configure control plane 232, as well as other infrastructure necessary (e.g., containers 248) to run containerized applications 250 on host 202.

Operations 300 proceed, at block 314, with deploying a control plane pod (e.g., control plane pod 236 in FIG. 2). In certain embodiments, the control plane pod is deployed based, at least in part, on the one or more intended infrastructure configuration parameters. As such, the control plane pod is brought up in a configured state. For example, as illustrated in FIG. 2, control plane pod 236, having infrastructure state controller 238 for managing a state of the infrastructure, is deployed. In certain other embodiments, control plane pod 236 is brought up in a default state and then later configured.

Operations 300 proceed, at block 316, with determining a number of containers to deploy on bare-metal (e.g., containers 248 to deploy on OS 204, as pod(s) 252, on host 202 in FIG. 2) based, at least in part, on the one or more intended infrastructure configuration parameters. In particular, infrastructure state controller 238, in FIG. 2, may indicate a number of containers 248 needed to run particular applications 250.

Operations 300 proceed, at block 318, with deploying one or more containers in pod(s) on bare-metal based on the determined number of containers to deploy. For example, in FIG. 2, one or more containers 248 may be deployed in a pod 252 on OS 204 for running containerized applications 250.

Operations 300 proceed, at block 320, with deploying an extension plane (e.g., extension plane 234 in FIG. 2) based, at least in part, on the one or more intended infrastructure configuration parameters. For example, as illustrated in FIG. 2, extension plane 234, including a runtime controller for worker nodes 240, an admin worker pod 241, and GitOps agents 242 may be deployed.

Operations 300 proceed, at block 322, with determining one or more applications (e.g., applications 250 in FIG. 2) to be instantiated on the one or more containers based on an applications manifest (e.g., applications manifest 214 in FIG. 2). For example, in FIG. 2, GitOps agents 242 pull information from applications manifest 214 stored on storage 212.

Operations 300 proceed, at block 324, with instantiating the one or more applications on the one or more containers deployed on bare-metal.

Subsequent to block 324, the deployed system may be enabled to run and manage bare-metal, containerized applications. In particular, the deployed system may manage a state of the infrastructure such that it aligns with an intended state of the infrastructure. Further, the deployed system may manage the containerized applications such that they align with their intended states. Management of each of these states may be separated.

Figure 4:
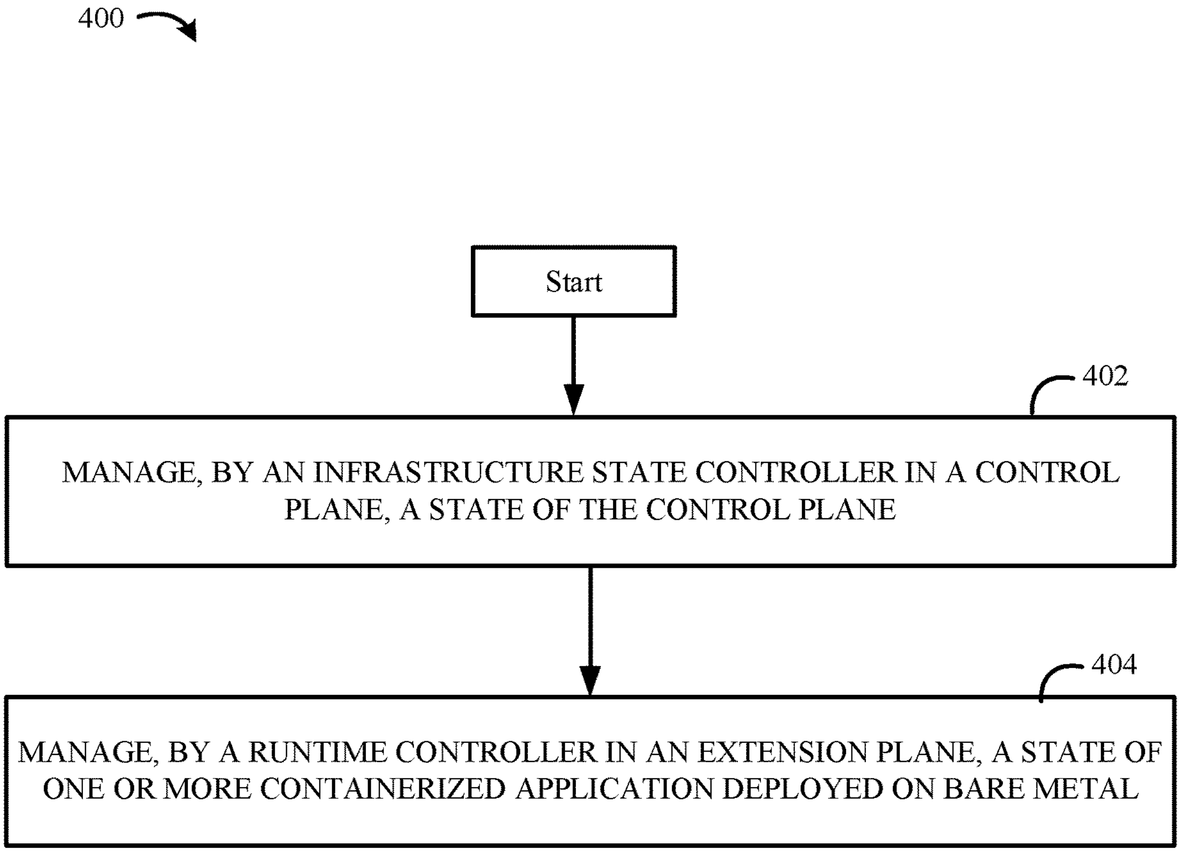
FIG. 4 is a flow diagram illustrating example operations for managing different states of a deployed system, according to embodiments of the present disclosure.

FIG. 4 is a flow diagram illustrating example operations 400 for managing different states of a deployed system according to aspects of the present disclosure. Operations 400 may be performed by one or more components illustrated in FIG. 2, and more specifically, infrastructure state controller 238 in control plane 232 and runtime controller for worker nodes 240 in extension plane 234.

As illustrated, operations 400 include, at block 402, an infrastructure state controller (e.g., infrastructure state controller 238) in the control plane managing a state of the control plane. At block 404, operations 400 further include a runtime controller (e.g., runtime controller for worker node 240) in the extension plane managing a state of containerized applications deployed on bare-metal.

Although operations of block 404 are illustrated as occurring subsequent to operations of block 402, in certain aspects, operations of blocks 402 and 404 may be performed concurrently such that the state of the entire system (e.g., including both the state of the infrastructure/control plane and the state of the containerized applications) is continuously being managed.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of automatically deploying a containerized application on an operating system of a device, the method comprising:

booting the device with the operating system;

powering on a first hypervisor as a first user process running on the operating system;

powering on a container engine as a second user process running on the operating system;

booting a virtual machine (VM) running a second hypervisor, wherein the VM is running on the first hypervisor, wherein the second hypervisor is an embedded hypervisor configured to provide resources for a control plane;

in response to booting the VM;

automatically obtaining, by the VM, one or more intended state configuration files defining a control plane configuration for providing services for at least deploying and managing the containerized application and application configuration parameters for the containerized application;

deploying, on the VM, a control plane pod configured according to the control plane configuration;

deploying one or more containers based on the control plane configuration, wherein the one or more containers are deployed on the operating system via the container engine;

deploying the containerized application identified by the application configuration parameters on the one or more containers;

deploying, on the VM, an infrastructure controller configured to manage a state of the control plane; and deploying, on the VM, a runtime controller for the one or more containers configured to manage a state of the one or more containers running the containerized application, wherein the infrastructure controller is deployed in the control plane, the runtime controller is deployed in an extension plane, and the control plane and the extension plane are logically separated planes.

2. The method of claim 1, wherein:

the first hypervisor runs in conjunction with the operating system of the device; and the embedded hypervisor runs in conjunction with a guest operating system of the VM.

3. The method of claim 1, wherein the device running the containerized application via the one or more containers deployed on the operating system of the device comprises a worker node.

4. The method of claim 1, wherein:

the control plane pod is deployed in the control plane.

5. The method of claim 1, wherein the infrastructure controller is configured to manage the state of the control plane based on:

monitoring for changes to the control plane configuration; and updating the state of the control plane based on detecting a change to the control plane configuration when monitoring for the changes to the control plane configuration.

6. The method of claim 1, wherein the runtime controller is configured to manage the state of the one or more containers running the containerized application based on:

monitoring for changes to the application configuration parameters; and updating the state of the one or more containers based on detecting a change to the application configuration parameters when monitoring for the changes to the application configuration parameters.

7. The method of claim 1, wherein:

the device obtains two intended state configuration files;

a first intended state configuration file of the two intended state configuration files defining the control plane configuration; and a second intended state configuration file of the two intended state configuration files defining the application configuration parameters.

8. The method of claim 1, wherein the one or more intended state configuration files are automatically obtained, by the VM, from a server external to the device or a universal serial bus (USB) thumb drive.

9. A system comprising:

one or more processors;

at least one memory, the one or more processors and the at least one memory configured to;

boot a device with an operating system;

power on a first hypervisor as a first user process running on the operating system;

power on a container engine as a second user process running on the operating system;

boot a virtual machine (VM) running a second hypervisor, wherein the VM is running on the first hypervisor, wherein the second hypervisor is an embedded hypervisor configured to provide resources for a control plane;

in response to booting the VM;

automatically obtain, by the VM, one or more intended state configuration files defining a control plane configuration for providing services for at least deploying and managing a containerized application and application configuration parameters for the containerized application;

deploy, on the VM, a control plane pod configured according to the control plane configuration;

deploy one or more containers based on the control plane configuration, wherein the one or more containers are deployed on the operating system via the container engine;

deploy the containerized application identified by the application configuration parameters on the one or more containers;

deploy, on the VM, an infrastructure controller configured to manage a state of the control plane; and deploy, on the VM, a runtime controller for the one or more containers configured to manage a state of the one or more containers running the containerized application, wherein the infrastructure controller is deployed in the control plane, the runtime controller is deployed in an extension plane, and the control plane and the extension plane are logically separated planes.

10. The system of claim 9, wherein:

the first hypervisor runs in conjunction with the operating system of the device; and the embedded hypervisor runs in conjunction with a guest operating system of the VM.

11. The system of claim 9, wherein the device running the containerized application via the one or more containers deployed on the operating system of the device comprises a worker node.

12. The system of claim 9, wherein:

the control plane pod is deployed in the control plane;

the one or more containers are deployed in a worker plane; and the control plane and the worker plane are logically separated planes.

13. The system of claim 9, wherein the infrastructure controller is configured to manage the state of the control plane based on:

monitoring for changes to the control plane configuration; and updating the state of the control plane based on detecting a change to the control plane configuration when monitoring for the changes to the control plane configuration.

14. The system of claim 9, wherein the runtime controller is configured to manage the state of the one or more containers running the containerized application based on:

monitoring for changes to the application configuration parameters; and updating the state of the one or more containers based on detecting a change to the application configuration parameters when monitoring for the changes to the application configuration parameters.

15. The system of claim 9, wherein:

the device obtains two intended state configuration files;

a first intended state configuration file of the two intended state configuration files defining the control plane configuration; and a second intended state configuration file of the two intended state configuration files defining the application configuration parameters.

16. The system of claim 9, wherein the one or more intended state configuration files are automatically obtained, by the VM, from a server external to the device or a universal serial bus (USB) thumb drive.

17. A non-transitory computer-readable medium comprising instructions that, when executed by one or more processors of a computing system, cause the computing system to perform operations for automatically deploying a containerized application on an operating system of a device, the operations comprising:

booting the device with the operating system;

powering on a first hypervisor as a first user process running on the operating system;

powering on a container engine as a second user process running on the operating system;

booting a virtual machine (VM) running a second hypervisor, wherein the VM is running on the first hypervisor, wherein the second hypervisor is an embedded hypervisor configured to provide resources for a control plane;

in response to booting the VM;

automatically obtaining, by the VM, one or more intended state configuration files defining a control plane configuration for providing services for at least deploying and managing the containerized application and application configuration parameters for the containerized application;

deploying, on the VM, a control plane pod configured according to the control plane configuration;

deploying one or more containers based on the control plane configuration, wherein the one or more containers are deployed on the operating system via the container engine;

deploying the containerized application identified by the application configuration parameters on the one or more containers;

deploying, on the VM, an infrastructure controller configured to manage a state of the control plane; and deploying, on the VM, a runtime controller for the one or more containers configured to manage a state of the one or more containers running the containerized application, wherein the infrastructure controller is deployed in the control plane, the runtime controller is deployed in an extension plane, and the control plane and the extension plane are logically separated planes.

18. The non-transitory computer-readable medium of claim 17, wherein:

the first hypervisor runs in conjunction with the operating system of the device; and the embedded hypervisor runs in conjunction with a guest operating system of the VM.

19. The non-transitory computer-readable medium of claim 17, wherein the device running the containerized application via the one or more containers deployed on the operating system of the device comprises a worker node.

20. The non-transitory computer-readable medium of claim 17, wherein the runtime controller is configured to manage the state of the one or more containers running the containerized application based on:

monitoring for changes to the application configuration parameters; and updating the state of the one or more containers based on detecting a change to the application configuration parameters when monitoring for the changes to the application configuration parameters.

* * * * *